United States Patent
Chaulk et al.

(10) Patent No.: US 7,640,264 B1
(45) Date of Patent: Dec. 29, 2009

(54) SYSTEM AND METHODS FOR QUERYING A REPORT DATABASE

(75) Inventors: Christopher A. Chaulk, Franklin, MA (US); Serge Marokhovsky, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 315 days.

(21) Appl. No.: 11/233,687

(22) Filed: Sep. 23, 2005

(51) Int. Cl.
*G06F 17/30* (2006.01)

(52) U.S. Cl. .............................. 707/102; 707/2; 707/3; 707/4; 707/5; 707/6; 707/9; 707/10; 707/103 R; 709/219; 709/229

(58) Field of Classification Search .................. 707/2, 707/3, 4, 5, 6, 9, 10, 102, 103 R; 709/219, 709/229
See application file for complete search history.

(56) References Cited

U.S. PATENT DOCUMENTS

| | | | | |
|---|---|---|---|---|
| 5,774,692 A * | 6/1998 | Boyer et al. | | 707/3 |
| 5,893,125 A * | 4/1999 | Shostak | | 715/511 |
| 5,894,311 A * | 4/1999 | Jackson | | 345/440 |
| 5,918,232 A * | 6/1999 | Pouschine et al. | | 707/103 R |
| 6,134,540 A * | 10/2000 | Carey et al. | | 707/2 |
| 6,148,296 A * | 11/2000 | Tabbara | | 707/3 |
| 6,691,100 B1 * | 2/2004 | Dector et al. | | 707/2 |
| 6,907,422 B1 * | 6/2005 | Predovic | | 707/2 |
| 2004/0122844 A1 * | 6/2004 | Malloy et al. | | 707/102 |
| 2005/0119996 A1 * | 6/2005 | Ohata et al. | | 707/3 |
| 2006/0031187 A1 * | 2/2006 | Pyrce et al. | | 707/1 |
| 2007/0083403 A1 * | 4/2007 | Baldwin et al. | | 705/7 |

* cited by examiner

*Primary Examiner*—Khanh B Pham
*Assistant Examiner*—Syling Yen
(74) *Attorney, Agent, or Firm*—Chapin IP Law, LLC; Barry W. Chapin, Esq.

(57) ABSTRACT

A decision support system including a query generation tool provides a Graphical User Interface (GUI) for generating a query of a Storage Area Network (SAN) database using interactive screen displays identifying manageable entities in the SAN and queryable statistics thereof. Configurations herein provide a query mechanism, or interface, that generates an executable query via a GUI having intuitive mnemonic labels corresponding to the real-world (i.e. SAN manageable entities) represented in the query database, rather than the technical database table and attribute names which tend to be more cryptic, particularly to an uninitiated query operator. The GUI presents a sequence of screens for selecting SAN manageable entities, report fields, selection criteria, and output format. The query logic computes SQL syntax for identifying corresponding database tables and attributes, performing the required joins between the tables, and selecting the report set of records for output in the resulting SQL query.

18 Claims, 16 Drawing Sheets

1. Define Initial Settings

Name

Query 2005-08-09 12:06:06

Description

Query Categories

Select a category to which this query should belong — 506

Asset Management

Select Data Source

● Current Data
○ Historical Data

● Date Range : From 08/09/2005 to 08/09/2005
  (mm/dd/yyyy)
○ Time Period  Last Week Select Frequency :

Daily Values (up to 42 days)

Steps: 1 > 2 > 3 > 4 > 5 > 6

6. Select Run Settings

Steps: 1 > 2 > 3 > 4 > 5 > 6

How many records do you want returned by the Query?
▼ Limit to First [1000] — 582

How long should the Query run before terminating?
▼ Limit to [10] [Seconds ▼] — 584

How would you like to output your results? — 588
Type [Screen ▼] Format [HTML ▼] — 586
☐ Notify by E-mail when the query is ready — 590

*Fig. 13*

Query Results

Query Name: Query 2005-08-09 12:06:06

Run Time Aug 9, 2005 at 12:13 PM Criteria

[View SQL] — 604

1 Total - Page 1 of 1

| Array ▲ | # Ports | # Mapped Meta Devices | # Shared Devices | Agent Type | Component Host ▲2 | Host ID | Host - Allocated - Usable (GB) | Host Model | Allocated Used % |
|---|---|---|---|---|---|---|---|---|---|
| APM00052106618 | 4 | 0 | 4 | Storage Agent for CLARiiON | Losbe097 | 55 | 1.04857E8 | X86 | 100.00 |

*Fig. 14*

Queries

37 items found, displaying all items.
1

| Name | Category | Type | Status | Last Run Time |
|---|---|---|---|---|
| ○ Accessible Unused Devices | Asset Management | Built-in | Complete | Aug 8, 2005 at 1:23 PM |
| ○ All Arrays_Configuration | Asset Management | Built-in | Complete | Aug 8, 2005 at 9:56 AM |
| ○ All Arrays_Utilization-Detail | Troubleshooting | Built-in | Complete | Aug 5, 2005 at 11:43 AM |
| ○ All Hosts_Allocation Details | Chargeback | Built-in | Complete | Aug 8, 2005 at 5:25 PM |
| ○ All Hosts_Utilization Details | Chargeback | Built-in | Complete | Aug 5, 2005 at 4:49 PM |
| ○ All arrays | Asset Management | Custom | Complete | Aug 8, 2005 at 11:00 AM |
| ○ All hosts - historical | Asset Management | Custom | Complete | Aug 8, 2005 at 3:22 PM |
| ○ Array Devices Allocated to Hosts | Asset Management | Built-in | Complete | Never Run |
| ○ Array devices query | Asset Management | Custom | Complete | Aug 8, 2005 at 9:56 AM |
| ○ Backup | Capacity Planning | Built-in | Complete | Aug 5, 2005 at 4:44 PM |

*Fig. 16*

SYSTEM AND METHODS FOR QUERYING A REPORT DATABASE

BACKGROUND

In a modern information processing environment, transactional data is often generated in the course of normal operations. With modern technology providing seemingly ever increasing storage capacity and processing resources, such transactional data has the potential to become large and cumbersome, as additional information and audit trail capability is sought. In a storage area network (SAN), for example, a management application generates transactions corresponding to quantitative metrics such as data storage used, storage available, frequency of access, usable capacity, and other statistical information. The statistical information is valuable from a diagnostic and maintenance perspective for various purposes, such as to identify areas of potential backlog, pinpoint performance shortfalls, and for trending analysis to map future demands.

Relational databases have gained popularity for storing such transactional data gathered from an information processing system. More recently, so-called multidimensional databases have provided a mechanism for storing and querying vast amounts of transactional data according to many attributes, or dimensions, such as time, location, product, department, and combinations, permutations, and/or subdivisions of these. While flexible, such multidimensional databases, also known as OnLine Analytical Processing (OLAP) systems, tend to be computation and storage intensive. A modern OLAP system has the potential to generate huge quantities of queryable data, and enables complex queries that require substantial computational resources.

In OLAP systems, as in relational databases (often the underlying storage mechanism in OLAP systems), data is stored in tables having associations to other tables. Report queries are processed by performing a join operation which traverses the associations between tables. However, the processing required is exponentially proportional to the number of entries in the tables. Accordingly, complex multidimensional queries tend to rapidly consume processing power, particularly when many tables are traversed to process the query. Accordingly, the report queries may create contention with the ongoing data gathering operations for the database that they interrogate. In a storage area network, where access to storage arrays is paramount, it is highly detrimental for the transactional processing of the management application to compete with or impede access to the storage arrays.

SUMMARY

A large managed information environment, such as a storage area network (SAN), accumulates many transactions resulting from ongoing operation of the system. A database stores the transactions to maintain statistical metrics pertaining to data access. The storage area network is responsive to data access requests through a variety of interconnected manageable entities. The manageable entities include devices such as storage arrays, connectivity devices (switches) and host computers, for example, as well as other manageable entities responsive to the management application. The database maintains information about the manageable entities in the storage area network such as access time, data volume, access rates, queue depth, and other statistics pertaining to performance, load and demands on the SAN. These transactions represent the usage and throughput of the system as entries in various database tables. In a storage area network, these transactions are the result of data access requests and associated operations among the manageable entities in the storage area network. These transactions are stored in a large online database operable to provide configuration and management control of the manageable entities in the SAN. A network storage management application also queries this database for diagnostic and preventative matters such as providing feedback, monitoring past throughput, and identifying resource utilization, bottlenecks, and performance shortfalls.

In a large storage area network, the online database is a managed object database that stores information about the manageable entities in the SAN. The managed object (MO) database is frequently updated to reflect activity in the SAN, and rapidly accumulates transactional data in an active SAN having high throughput rates. The managed object database may also be queried to generate reports of the statistical data stored therein. In an effort to relieve the demand on the online database from the query requests used to generate the reports, the online data may be offloaded to an offline database in a queryable format adapted for querying and reporting, rather than realtime updating as in the online database. The conventional offloaded data may therefore be retrieved from the offline database in a manner that minimizes contention for the online database.

In a conventional storage area network (SAN), therefore, the operational data pertaining to throughput and performance metrics is often offloaded, or mirrored, in a query database to avoid burdening the online data access mechanism with query access attempts for report generation. The query database serves different purposes than the online gathering database (e.g. the managed object database), and therefore employs a different structure than the online counterpart. For example, the query database may be employed for queries about access throughput days or weeks following the actual access attempt. Accordingly, such statistical and longer term information is burdensome to maintain in the online database which is adapted for real time or near real time transactions.

Unfortunately, the conventional offloaded data suffers from several shortcomings. The offloaded data is arranged in tables that optimize the storage and processing efficiency, which may not necessarily provide an intuitive link to the manageable entities in the SAN (e.g. storage arrays, connectivity devices, and hosts). Accordingly, configurations of the invention are based, in part, on the observation that the arrangement, labeling, and nomenclature of the offline database differs from the real-world SAN entities that the database is intended to model. Accordingly, it can become cumbersome for an uninitiated operator or user to identify fields and construct query language to target particular information. One alternative is provided by an assortment of predetermined queries directed at likely areas of interest. However, this approach limits the user to the predefined queries.

Therefore, configurations herein substantially overcome the shortcoming presented by the arrangement of the offline database by providing a query mechanism that generates an executable query via a GUI having intuitive mnemonic labels corresponding to the real-world (i.e. SAN manageable entities) represented in the query database, rather than the technical database table and attribute names which tend to be more cryptic, particularly to an uninitiated query operator. A query processor dynamically discovers and creates relationships between the objects. This dynamic discovery is used during validation of the GUI selected objects for reporting. The generated query is in a SQL format, modifiable by the operator and interpretable by the database, or, more specifically, by the database management system. The GUI presents a sequence of screens for selecting SAN manageable entities, report fields, selection criteria, and output format. The query logic computes SQL syntax for identifying corresponding database tables and attributes, performing the required joins between the tables, and selecting the report set of records for output in the resulting SQL query. The SQL query may be further modified or stored for custom or repetitive queries. In this manner, a complex SQL query is generated from an intuitive sequence of GUI screens which present query options according to standard SAN mnemonics, which the query logic transforms into SQL syntax for interpretation in performing the query.

In further detail, the method of processing report queries in a storage area network according to principles discussed herein includes identifying managed objects for inclusion in a report, in which the managed objects are responsive to a management application for performing actions in the SAN, and determining tables containing attributes of the managed objects, the attributes reflective of the performed actions. The method computes relations between the determined tables, such that the relations associate tables of a particular type to other tables of another type based on attribute values. A query processor then computes fields applicable to the report by traversing the computed relations.

In the exemplary configuration, computing the relations includes traversing an object model corresponding to the tables in the database, as requested by the query. A GUI driven query processor identifies relations between the tables, and identifies key fields including at least one attribute of a table for use in the output report. Computing the output fields includes defining a join between applicable tables according to the identified relations, depending on the tables corresponding to the request. Query logic generates a query operable to compute the report from the determined tables, such that the query has a scripted format (e.g. SQL) adapted for interactive modification and customization. The query processor executes the query on the report database to generate a query result, in which the execution performs the joins including a fact table and at least one dimension table.

In the exemplary arrangement, reporting may include selecting a predetermined query from a list of predetermined queries, in which the predetermined queries are operable to generate a report responsive to user request criteria corresponding to the predetermined query. Users or operators may modify the selected predetermined query via an interactive interface by modifying statements in the query.

Alternate configurations of the invention include a multiprogramming or multiprocessing computerized device such as a workstation, handheld or laptop computer, cellphones or PDA device, or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 7-16 show the sequence of GUI screens for query processing in the system of FIG. 3.

DETAILED DESCRIPTION

A query generation tool provides a Graphical User Interface (GUI) for generating a query of a Storage Area Network (SAN) database using interactive screen displays identifying manageable entities in the SAN and queryable statistics thereof. Configurations herein provide a query mechanism, or interface, that generates an executable query via a GUI having intuitive mnemonic labels corresponding to the real-world (i.e. SAN manageable entities) represented in the query database, rather than the technical database table and attribute names which tend to be more cryptic, particularly to an uninitiated query operator. The generated query is in a SQL format, modifiable by the operator and interpretable by the database, or, more specifically, by the database management system (DBMS). The GUI presents a sequence of screens for selecting SAN manageable entities, report fields, selection criteria, and output format. The query logic computes SQL syntax for identifying corresponding database tables and attributes, performing the required joins between the tables, and selecting the report set of records for output in the resulting SQL query. The SQL query may be further modified or stored for custom or repetitive queries. In this manner, a complex SQL query is generated from an intuitive sequence of GUI screens which present query options according to standard SAN mnemonics, which the query logic transforms into SQL syntax for interpretation in performing the query.

Figure 1:
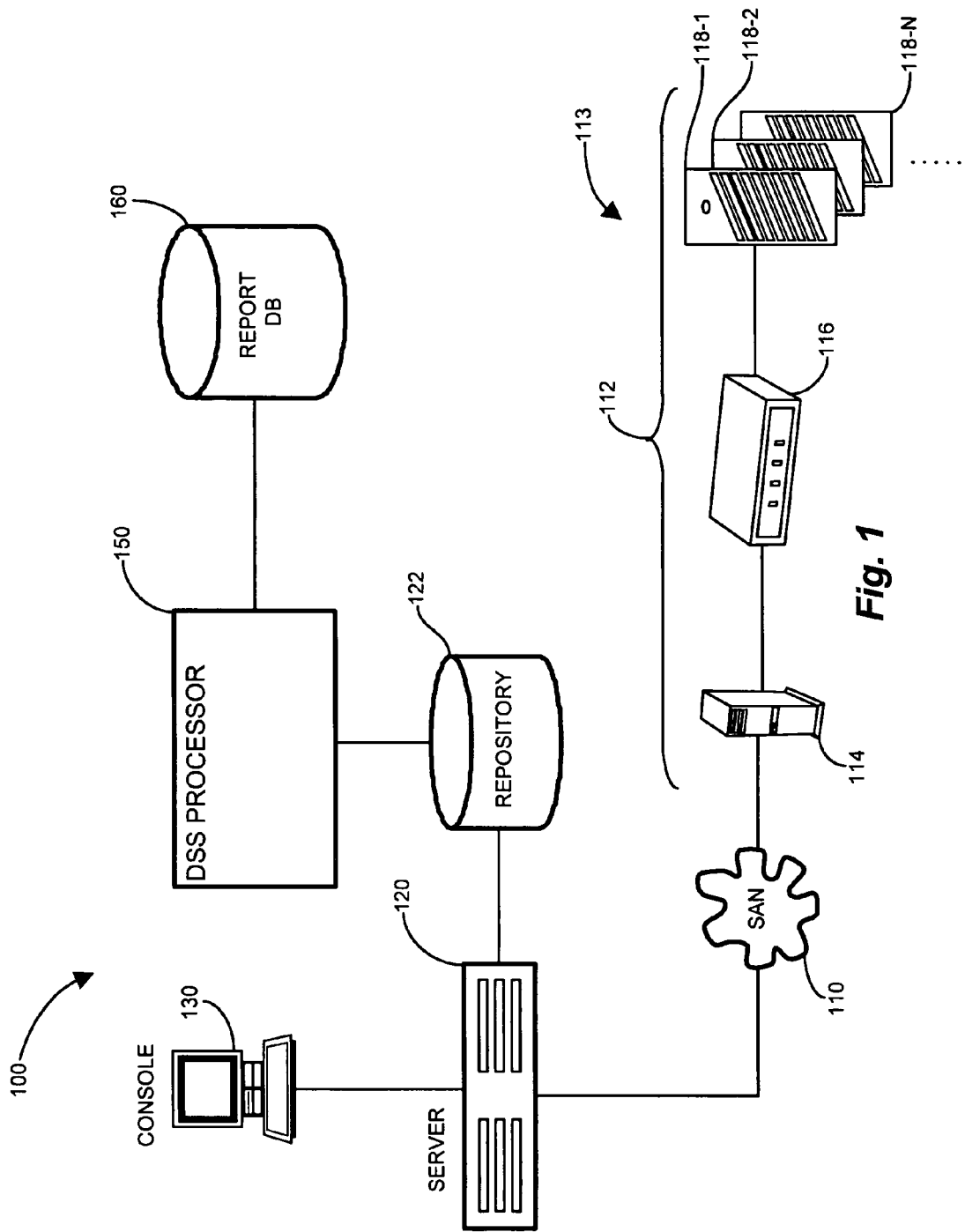
FIG. 1 is a context diagram of an exemplary managed information environment suitable for use with configurations discussed herein.

FIG. 1 is a context diagram of an exemplary managed information environment 100 suitable for use with configurations discussed herein. Referring to FIG. 1, in the exemplary environment 100, a storage area network 110 is depicted. The exemplary storage array network 110 is an interconnection 113 of manageable entities 112, collectively employed for information storage and retrieval for a user community (not specifically shown). A typical SAN 110 includes many manageable entities 112, such as storage arrays (e.g. disk drives) 118-1 ... 118-N, connectivity devices (e.g. switches) 116 and hosts (e.g. server computers) 114. The exemplary SAN interconnection 113 shown is a simplified form of an actual SAN, which typically includes many storage arrays 118-1 ... 118-N of different types, along with interconnected switching devices 116 and hosts 114, thus forming a complex interconnection of manageable entities 112. Further, each of the manageable entities 112 may include other integrated or embedded manageable entities, such as forwarding engines, ports, and processes such as agents (not specifically shown).

The manageable entities 112 connect to a server 120 responsive to a console 130 for managing and maintaining the manageable entities 112 in the SAN 110. The server 120 accumulates statistical, accounting and performance data about the manageable entities 112 for storage in a central repository 122 such as a managed object (MO) database. The repository 122 is a real time or near real time data gathering mechanism for gathering SAN 110 access data without impeding data retrieval services to the user community. In accordance with the principles of the invention, a Decision Support System (DSS) processor 150 transforms the data in the repository 122 into a report database 160 for offline query response, as will now be discussed in further detail. In this manner, the DSS processor 150 is responsive to user queries for report data via the report database 160, which stores data in a manner more suited to reports than the online repository 122. The report database 160 is typically refreshed from the online repository 122 on a daily basis for providing current query and report capability to users and operators of the SAN console 130. The report database 160 structure and refresh operation is discussed further in copending U.S. patent application Ser. No. 11/233,811, filed Sep. 29, 2005, entitled "SYSTEM AND METHODS FOR MODELING A REPORT QUERY DATABASE", assigned to the assignee of the present application and incorporated herein by reference.

Figure 2:
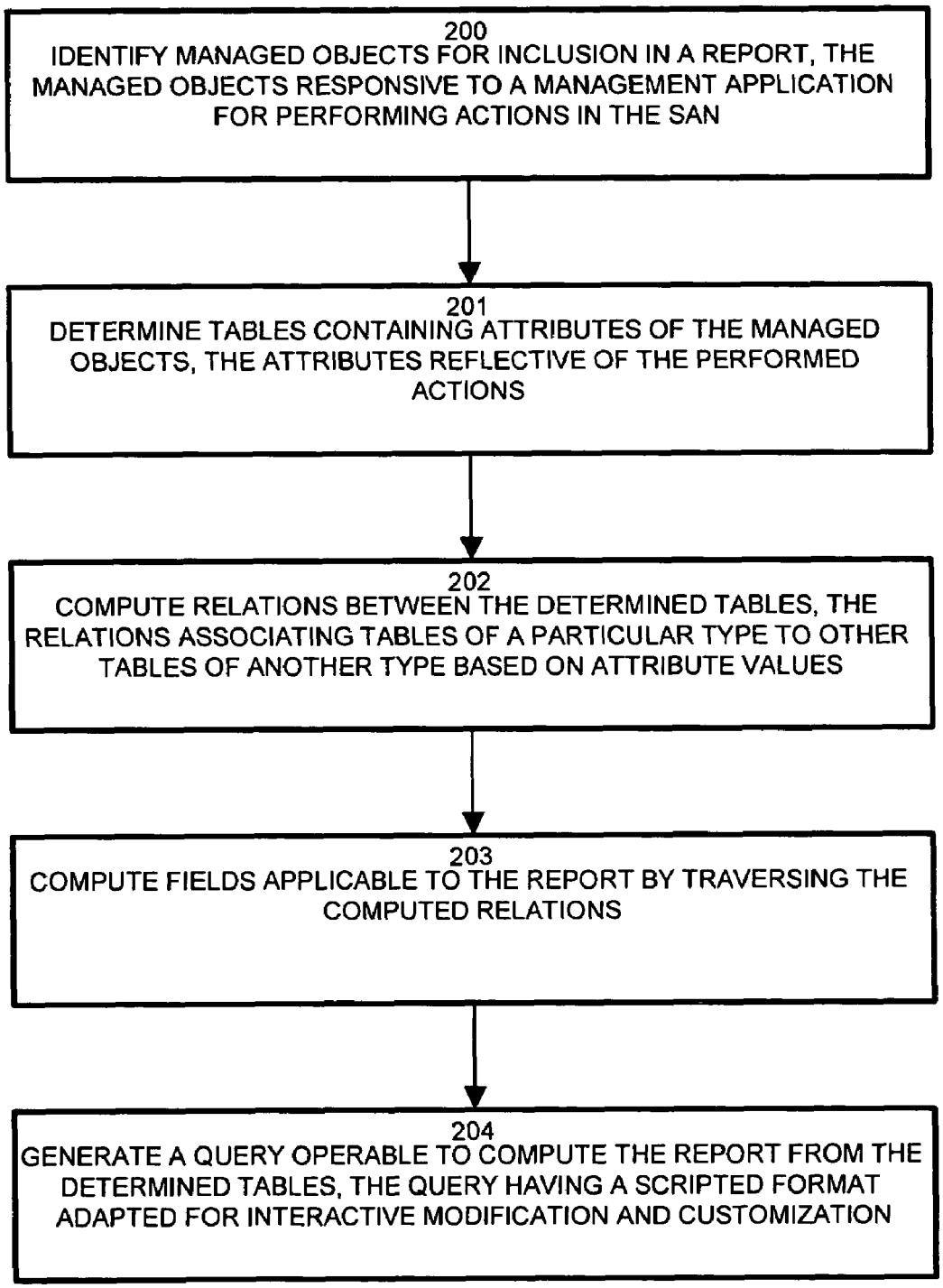
FIG. 2 is a flowchart of query processing in the system of FIG. 1.

FIG. 2 is a flowchart of query processing in the system of FIG. 1. Referring to FIGS. 1 and 2, the DSS processor 150 provides a query support system for processing report queries in a storage area network 110 by identifying manageable entities 112 (e.g. SAN managed objects) for inclusion in a report, in which the managed objects are responsive to a management application executing in the server 120 for performing actions in the SAN 110, as depicted at step 200. The identification is performed by a GUI, discussed further below. Based on the selections, at step 201, the DSS processor 150 determines tables containing attributes of the managed objects, in which the attributes are reflective of the performed actions on the SAN. In step 202, depending on the determined tables, the DSS 150 processor computes relations between the determined tables, in which the relations associate tables of a particular type to other tables of another type based on attribute values. The associations are derived from the object model, discussed further below, which depicts the entity-relation diagram between the database tables. Using the report request from the user, the DSS processor computes the fields applicable to the report by traversing the computed relations, as depicted at step 203. The DSS processor 150 typically traverses multiple tables, via the associations, to retrieve the requested attributes. At step 204, using the identified attributes and tables, the DSS processor 150 generates a query operable to compute the report from the determined tables, such that the query has a scripted format adapted for interactive modification and customization. In the exemplary configuration, the query is in the form of Structured Query Language (SQL) syntax operable to interrogate the report database 160.

Figure 3:
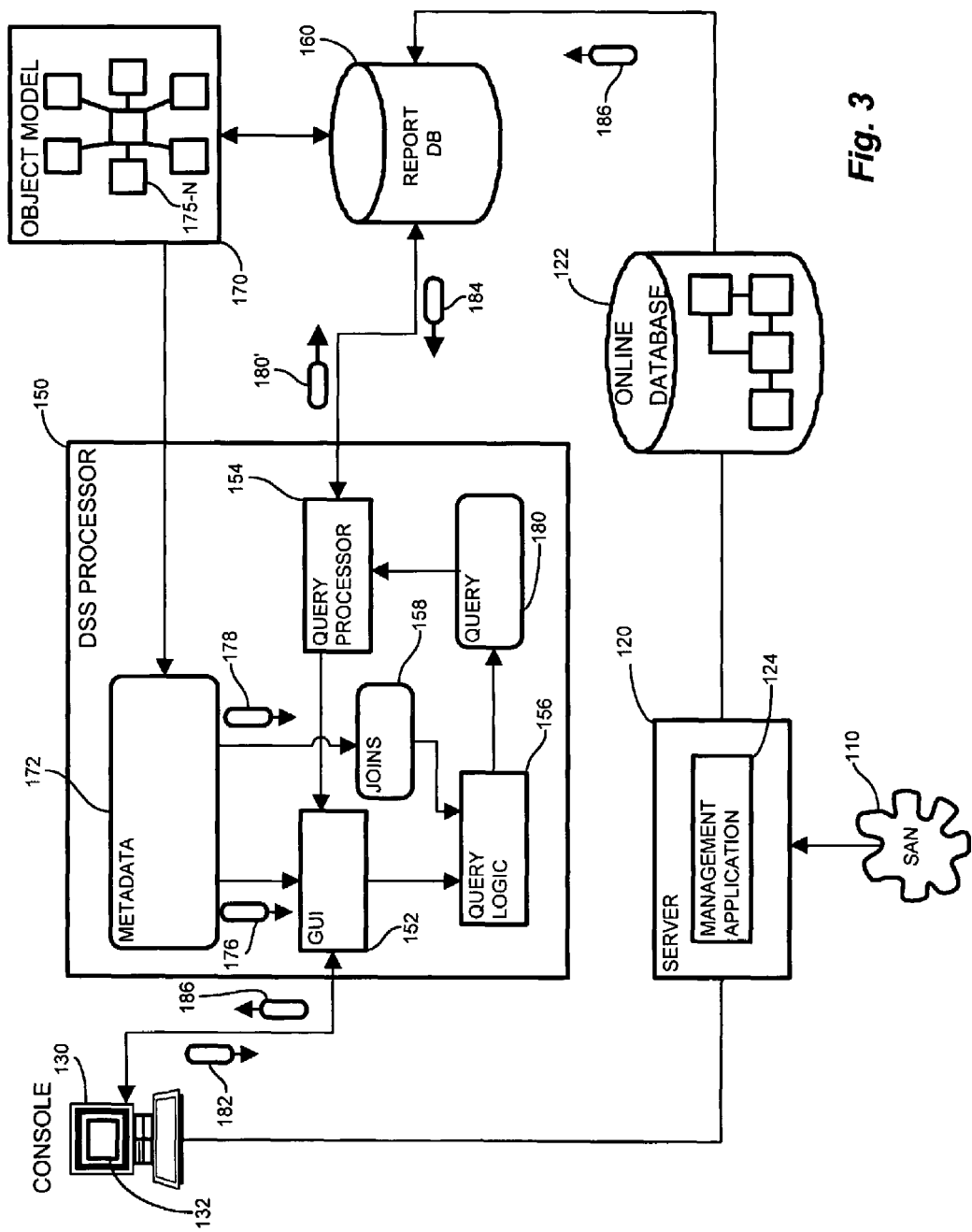
FIG. 3 is a block diagram for query processing in the environment of FIG. 1.
Figure 4:
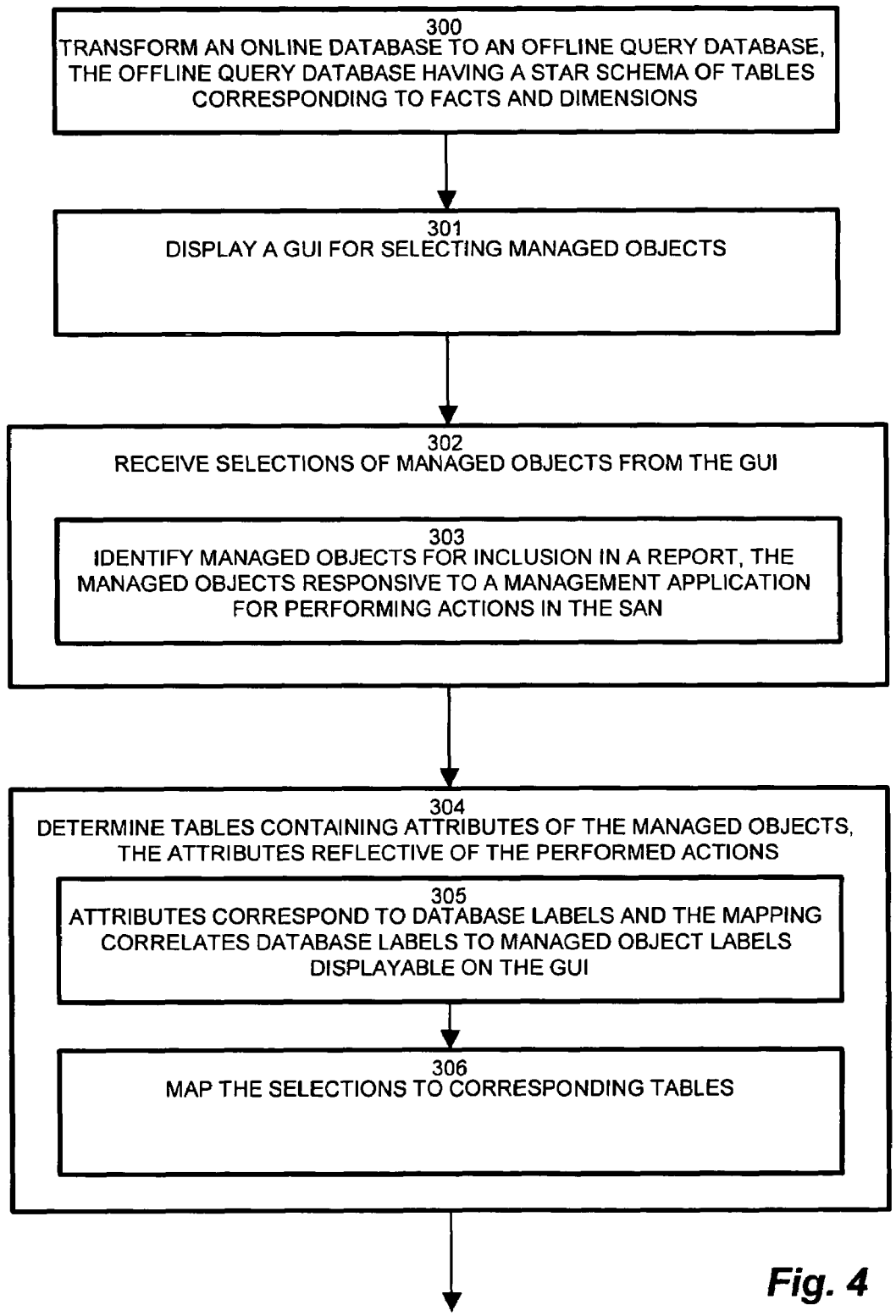
FIGS. 4-6 are a flowchart of query processing as per the block diagram of FIG. 3.
Figure 5:
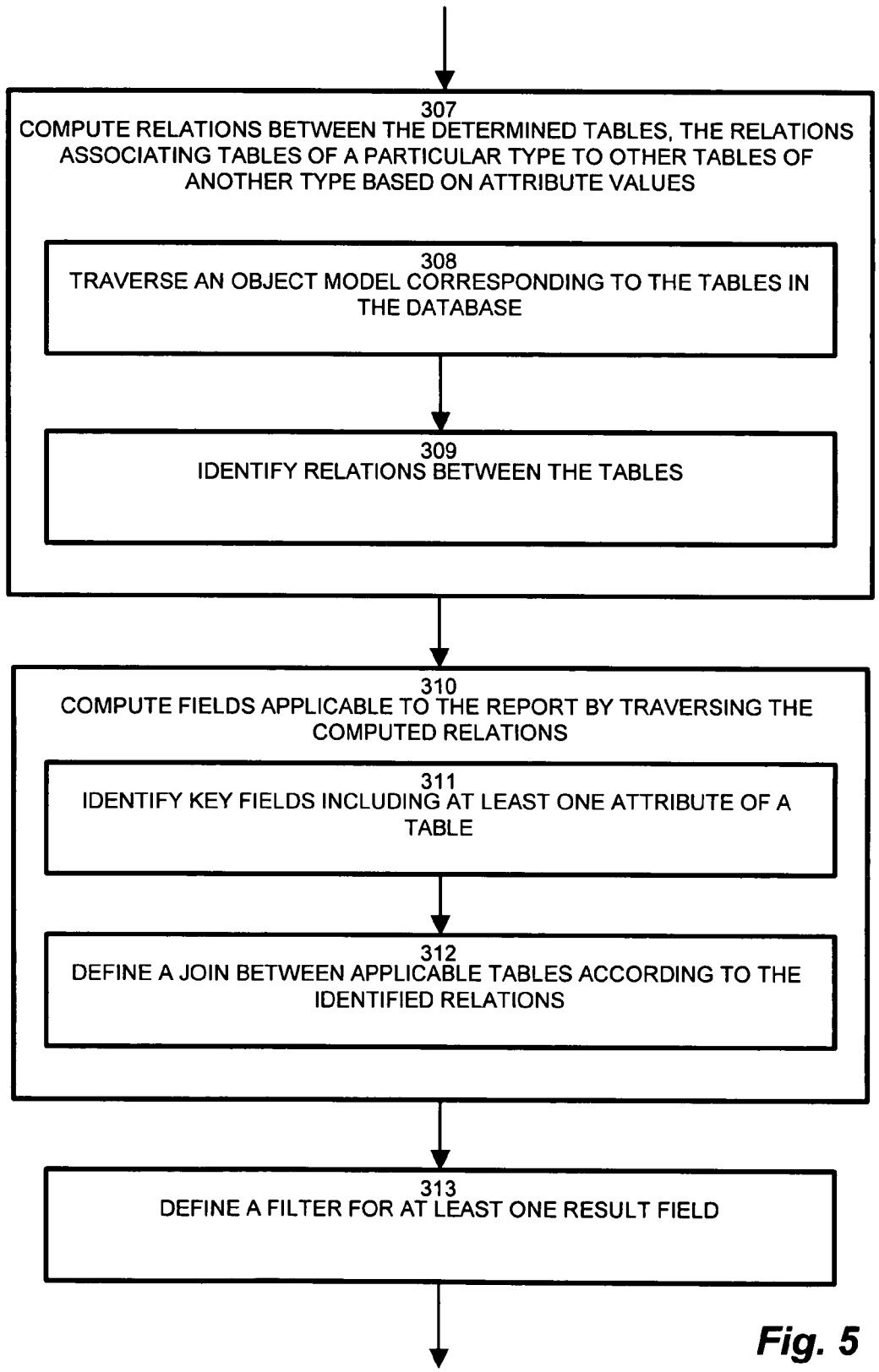
Figure 6:
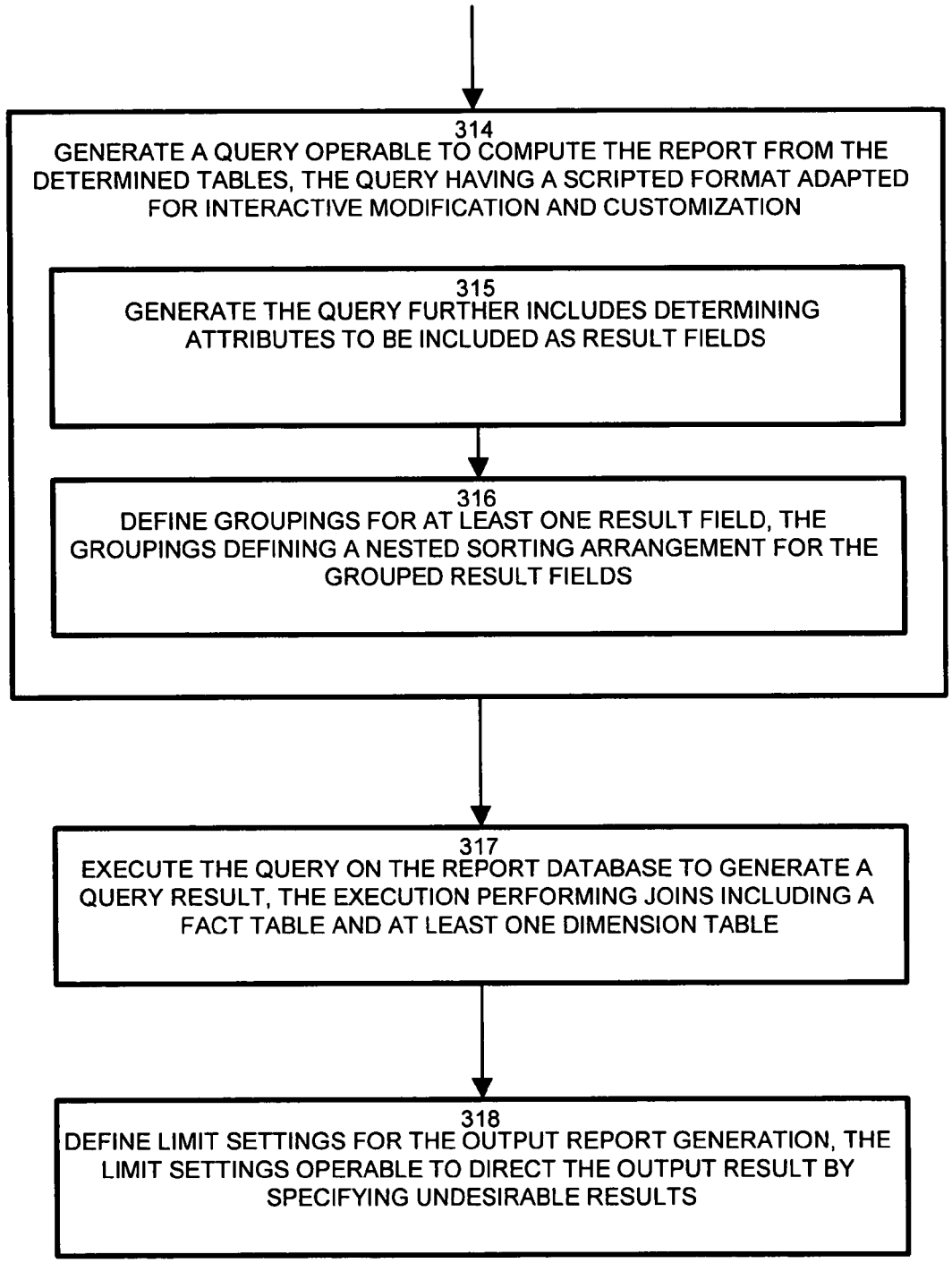

FIG. 3 is a block diagram for query processing in the environment of FIG. 1. Referring to FIGS. 1-3, the Decision Support System processor 150 includes a graphical user interface (GUI) 152, a query processor 154 and query logic 156. The DSS processor 150 receives metadata 172 from based on the object model 170 for the report database 160. The object model 170, therefore, effectively defines a report schema indicative of the tables 175-N and associations between the tables in the report database 160. The metadata 172 includes the table and association information defined by the object model 170. The GUI 152 employs table data 176 for displaying and interpreting the query response and request screens to the user, shown below in FIGS. 9-16. The GUI screens present query options in a managed object perspective, employing mnemonics of the SAN managed objects (i.e. manageable entities), rather than the database labels defining the tables and associations. Therefore, the GUI 152 allows the user to define a query request 182 in terms of manageable entities 112 which they interact with (i.e. the "real world" entities), rather than having to specify the database labels identifying the individual tables and attributes. The query logic 156 employs the association data 178 to perform joins 158 between tables 175-N for satisfying the query request 182 from the user. The query logic 156 generates a query 180, such as a SQL script, operative to perform database operations for satisfying the user request 182. The query processor 154 is responsive to the query 180 for executing the query 180' on the report database 160, and receiving the query response 184.

In operation, the SAN 110 generates statistical and performance data during the normal course of operations when carrying out data retrieval requests for users. The server 120 stores this data in a repository, which may be an online repository 122 such as a managed object database. The report database 160 aggregates the information in the online database 122 for query and reporting purposes. Since the data format (i.e. schema) employed for capturing the data from the SAN 110 is tuned to not impede SAN data access, it is not necessarily the optimal format for querying and reporting. Accordingly, the object model 170 defining the report database 160 defines a schema which is more suited to the report queries 182 received from the console 130. The object model 170 and corresponding refresh operations are discussed further in the copending patent application cited above. In the exemplary configuration, the object model 174 defines a star schema having central fact tables surrounded (i.e. having associations to) related dimension tables. In this manner, the report DB 160 receives periodic offloaded transactional data 186 from the online database 122, restructures it according to the query object model 170, and performs queries responsive to user requests 182 based on the managed object labels presented by the GUI 152, rather than the database labels employed by the resulting query 180 which traverses the report database 160.

FIGS. 4-7 are a flowchart of query processing as per the block diagram of FIG. 3. Referring to FIGS. 3-7, processing of a user report query request 182 is shown in further detail, followed by an exemplary screen sequence displayed by the GUI 152 in FIGS. 8-16. At step 300, The DSS processor 150 first transforms the online database 122 to the offline query database 160, such that the offline query database 160 has a star schema (e.g. object model 174) of tables 175-N corresponding to facts and dimensions. Further disclosure of mapping and transformation of the online database to the object model 174 may be found in the copending U.S. patent application cited above.

The DSS processor 150 invokes the GUI 152 to display a GUI screen 132 on the console 130 for selecting manageable entities 112 for which the user desires reporting, as disclosed at step 301. The table information 176 employed by the GUI 152 is obtained from the metadata 172. At step 302, a user indicates desired manageable entities 112 via the GUI screen 132, and the GUI 152 receives selections of manageable entities 112 from the GUI screen 132 in the user request 182. The query logic 156 begins processing the report query 182 by identifying manageable entities 112 for inclusion in the report 186, in which the manageable entities 112 are responsive to the management application 124 for performing actions in the SAN 110.

The query logic, at step 304, determines tables containing attributes of the manageable entities, in which the attributes are reflective of the performed actions in the SAN 110. At step 305, the query logic 156 maps the selections to corresponding tables in the database 160. As depicted at step 306, the attributes correspond to database labels and the mapping correlates database labels to managed object (manageable entity 112) labels displayable on the GUI screen 132. From the user perspective, the manageable entity labels 112 are more intuitive to the user, since the database labels tend to follow the database schema mnemonics of the object model 174, and are therefore of a more technical nature. The mapping, therefore, correlates the manageable entities, relating to the user context, to the database tables and attributes, relating to the database 160 organization.

Based on the attributes and tables 175-N needed to satisfy the request 182, the query logic 156 computes relations between the determined tables 175-N, such that the relations associate tables of a particular type to other tables of another type based on attribute values, as depicted at step 307. In the exemplary configuration, a relational database form is employed in the report DB 160. The object model 174, or schema, therefore indicates the relations between the entities (tables), and the metadata 172 is derived from this information. Therefore, computing relations further includes, at step 308, traversing the object model 174 corresponding to the tables 175-N in the database 160. The query logic 156 employs the association information 178 to identifying relations between the tables, as shown at step 309, which will be employed to define joins 158 between the tables 175-N to gather the attribute values (fields) for the report 186. The association information is further employed to validate the objects the user selected for reporting, discussed further below in the GUI screens. For example, the GUI will validate and detect if a report is requested on unrelated fields, such that a join is not available between them, for example.

At step 310, the query logic 156 computes fields applicable to the report by traversing the computed relations, and identifies key fields including at least one attribute of a table 175-N, as depicted at step 311. Attributers of different tables having an association are joined based on matching key values in attributes of each table. More complex joins 158 may be employed to include multiple tables 175-N, each joined by a key field via an association to another field, in order to gather each requested field. Accordingly, computing fields further comprises defining a join between applicable tables 175-N according to the identified relations, as disclosed at step 312. Optionally, a report may request only a subset of the fields from a particular table for reporting. Therefore, at step 313 the query logic 156 defines a filter for at least one result field, if the user request 182 specifies less than all fields in the joined tables 175-N.

The operation of the query logic 156 is to generate a query 180 interpreted by the report database 160 for generating the report 186 responsive to the user request 182. In the exemplary configuration, the report DB 160 is a relational database (RDB), and is responsive to a database management system (DBMS) provided by a database vendor such as ORACLE® or other vendor. Accordingly, the query 180 is in the form of a SQL script employing SQL syntax as is known in the art for accessing, joining, and extracting information from the relevant tables 175-N. Therefore, the query logic 156 generates SQL statements for selecting, joining, sorting, and outputting requested fields from the report DB 160. Alternate configurations may employ other database management systems. Such relational databases are particularly flexible for the above described join operations, and further provide an efficient framework for large multidimensional operations as an online analytical processing (OLAP) system. Multidimensional queries are facilitated by the star schema approach outlined above, having a fact table and multiple dimensional tables, and is further discussed in the copending application cited above.

Accordingly, the query logic generates a query 180 operable to compute the report 186 from the determined tables 175-N, such that the query 180 has a scripted format adapted for interactive modification and customization, as depicted at step 314. Generating the query 180 further includes determining attributes to be included as result fields, as shown at step 315. The result fields are the attribute values which were not omitted during the filtering at step 313, and are retrieved for output in the report 186. A user may further request grouping and or sorting on particular attribute values. Accordingly, at step 316, the query logic 156 defines groupings for at least one result field, such that the groupings defining a nested sorting arrangement for the grouped result fields. Multiple sorted groups may be included in a particular query 180, and result in a nesting of the attribute values based on the user selection, shown further below in the GUI screens in FIGS. 7-16.

The report DB 160, using the corresponding DBMS, executes the query 180 on the report database to generate a query result, such that the query processor 154 performs joins including a fact table and at least one dimension table as indicated by the SQL statements in the query 180. The query 180 further defines limit settings for the output report generation, such that the limit settings are operable to direct the output result by specifying undesirable results. The limit settings define runtime and display boundaries such that the queries 180 do not produce an exorbitant amount of report data and does not consume excessive CPU resources such as by a complex join having many tables, also shown further below in the GUI screens. The query processor 154 sends the completed query report 186 to the GUI 152 for display to the user on the screen 132.

FIGS. 7-16 show the sequence of GUI 152 screens for query processing in the system of FIG. 3. Referring to FIGS. 7-16 and 3, in FIG. 7, the GUI 152 displays an initial setting screen 500. A query name 502, description 504 and category 506 are selected by the user. The name 502 and description 504 are mnemonic identifiers for the output report 186. The category 506 aids in saving and indexing the resulting query 180 for later usage, discussed further below in FIG. 16 with respect to saved and predetermined (e.g. default) queries. A data source 508 specifies the timeframe from which the report data is obtained. Depending on the configuration and archive parameters, historical data may be data older than 60 days, which may be stored in a lower resolution (i.e. abridged) form. The date range 510 specifies date ranges within the queried data source 508.

Figure 8:
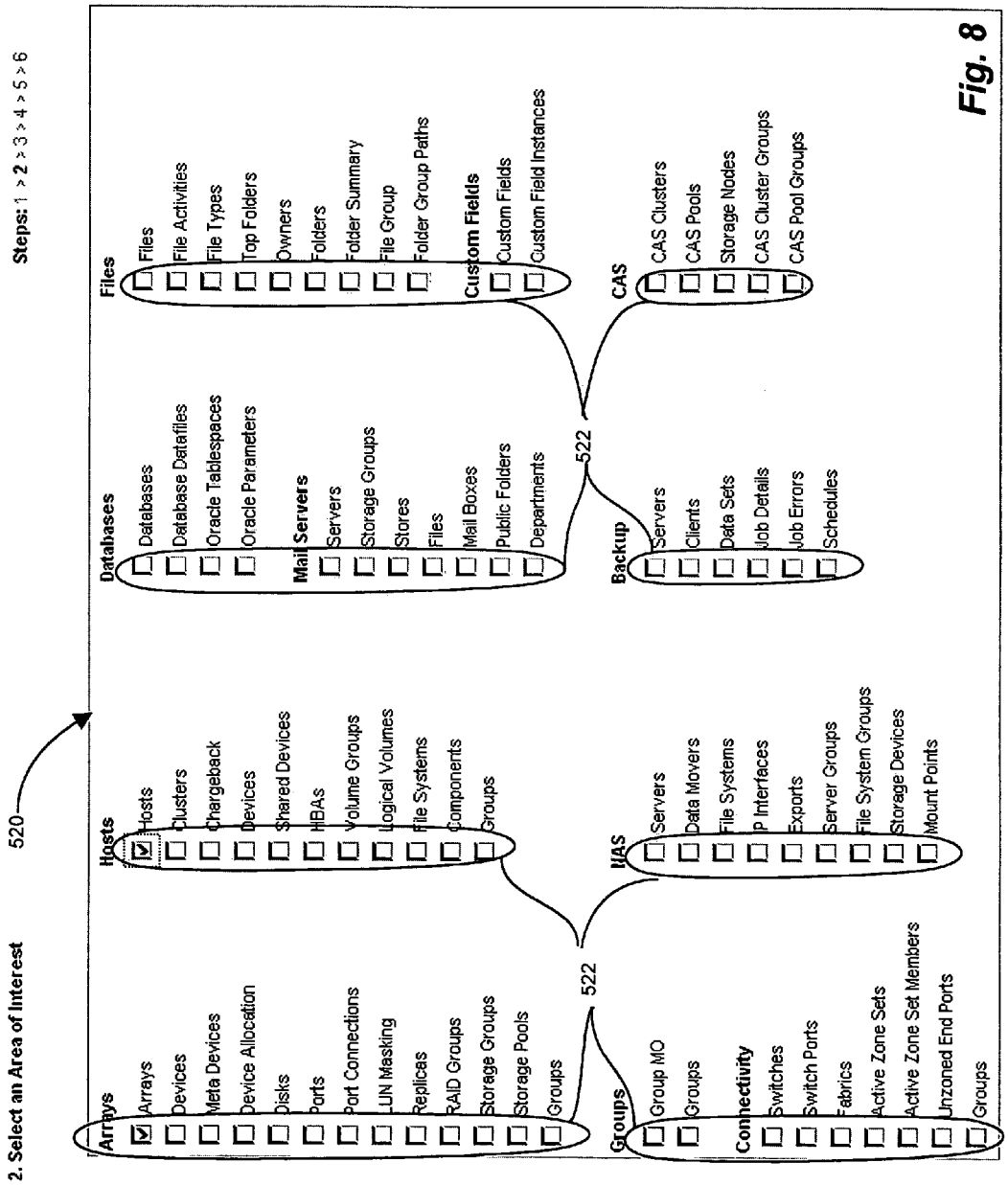

FIG. 8 shows the selection screen 520 for the area of interest, and identifies the database tables 175-N for the query 180. The areas of interest specify the manageable entities 112 for which report data is sought, and has selections 522 with labels corresponding the SAN 110 manageable entities 112 (i.e. "real world" devices). The selections 522 map to the database tables and attributes in the data (object) model 174.

Figure 9:
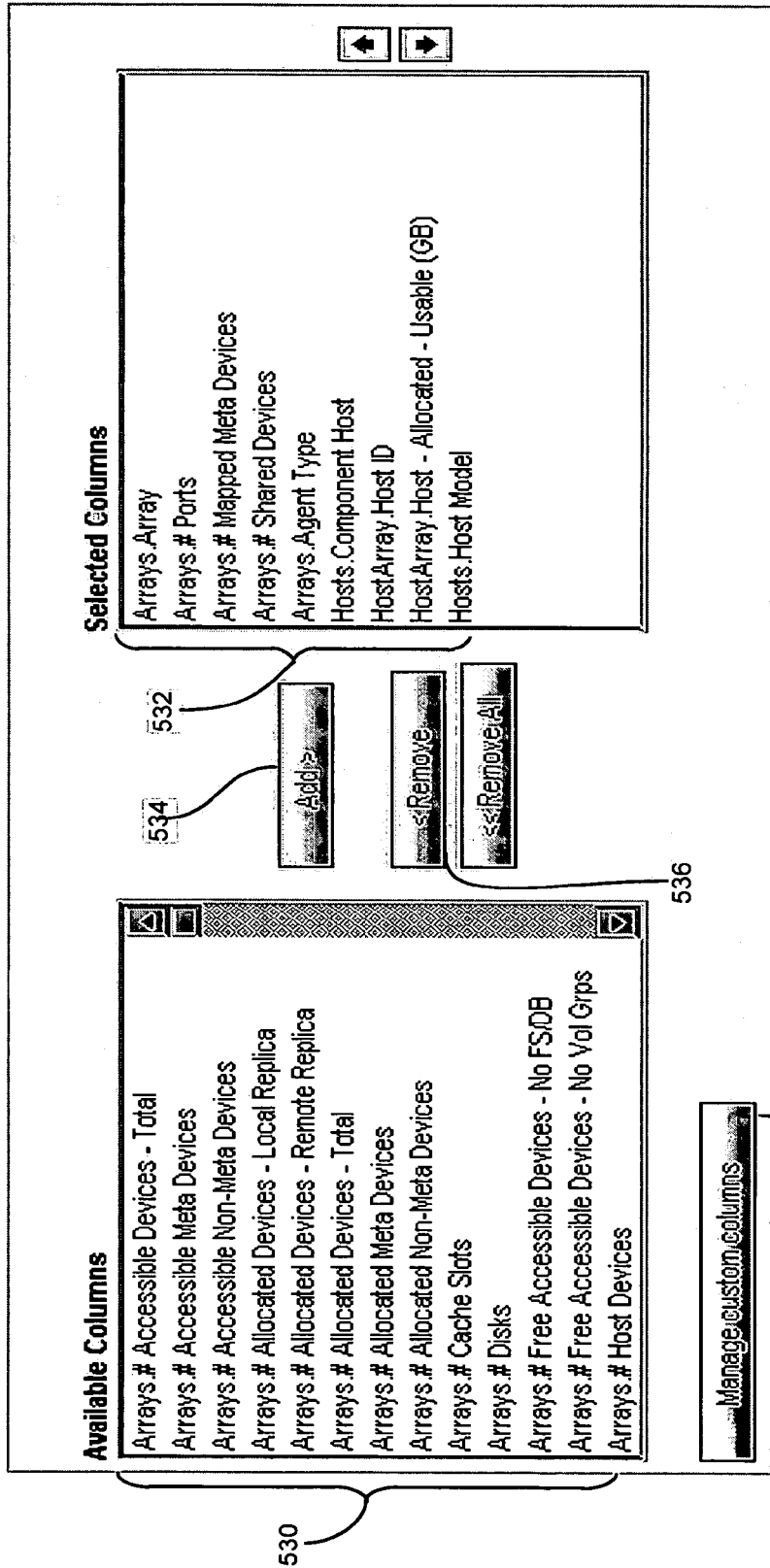

FIG. 9 shows the GUI interface for selecting columns for the output report 186. In the exemplary configuration, the available columns 530 for output include all the attributes (fields) in the tables 175 mapped as a result of the selections 522 of the area of interest screen 520. Users select columns 532 for the report 186 with the add button 534, and remove columns with the remove button 536. Since a selection triggering a large number of tables 175-N may result in numerous potential fields 530 (available output report columns), a user may want to select a small subset of fields 532 for the report 186. As indicated above, the attributes of different tables 175-N are associated by performing joins 158 between the tables 175-N (e.g. associations from the object model 174). Further, a user may generate custom fields from operations on one or more of the available columns 530 via button.

Figure 10:
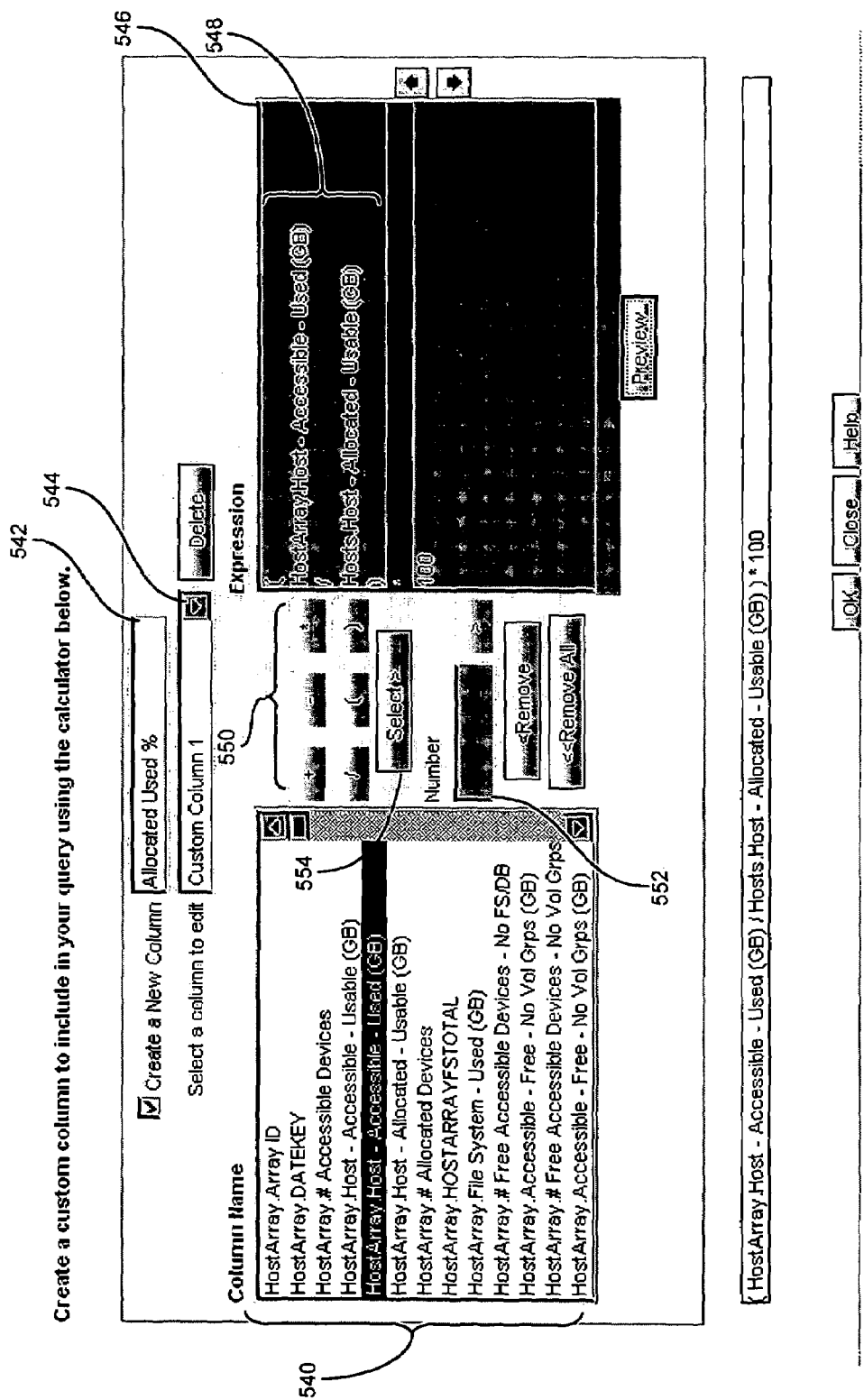
Figure 11:
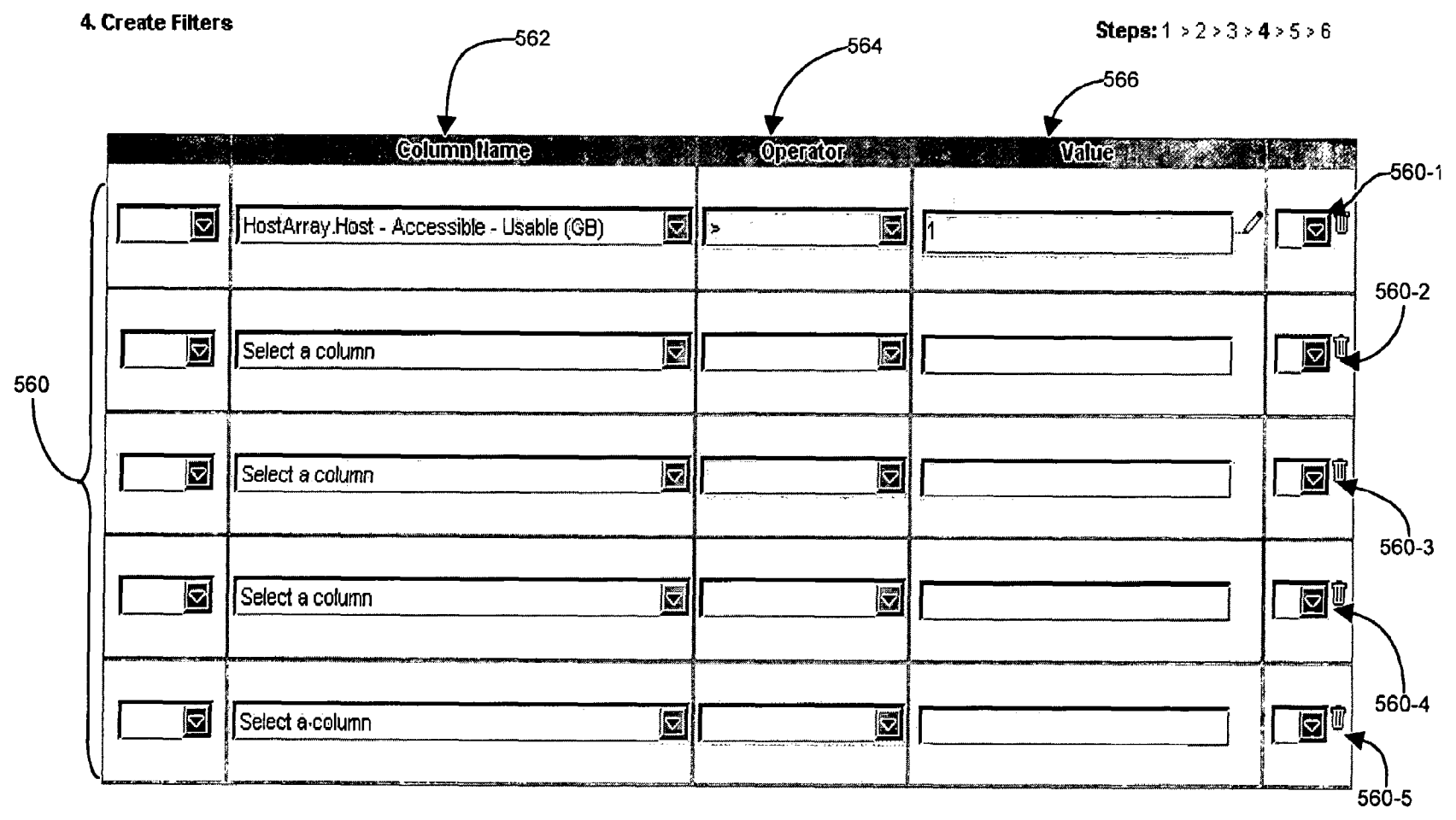

FIG. 10 shows custom field selection. Referring to FIGS. 10 and 11, a selection of column names 540 lists available fields for use in a custom column expression. In particular circumstances, a user may define an additional column as a deterministic function of values in other columns. The column names 540 are similar to the available columns 530, and lists the attributes of tables 175-N selected for the query. A column name 542 window receives the name of the new custom column, and an expression window 546 shows the expression 546 for computing the custom column 542. A selection pulldown 544 allows modification of previously entered custom columns 542. A user enters operators 550 and common names 540 (fields) via a select button 554. The resulting expression 548 is displayed in the expression window 546. Numerical values may be entered via the number window 552. In this manner, a user may define custom fields 542 computed from other fields, such as summations, differences, and unit operations (e.g. gigabytes to terabytes, for example).

FIG. 11 shows filter definition for narrowing the results. Referring to FIGS. 9 and 11, filters 560 each include a column name 562, an operator 564 and a value 566. The column name identifies the filtered column from among the selected columns 532. The operator 564 indicates a function or operation, typically a mathematical expression, for comparison with a value 566. In operation, the query processor 154 applies the operator and the value 566 to the attribute specified by the column name 562. Therefore, each of the filters 560 returns a Boolean result about whether to include the entry corresponding to the column. For example, the filter 560-1 indicates that records are to be included in the report if the host accessible usable attribute 562 is greater than 1 GB, or, restating, list hosts having usable storage greater than 1 GB in the output report 186.

Figure 12:
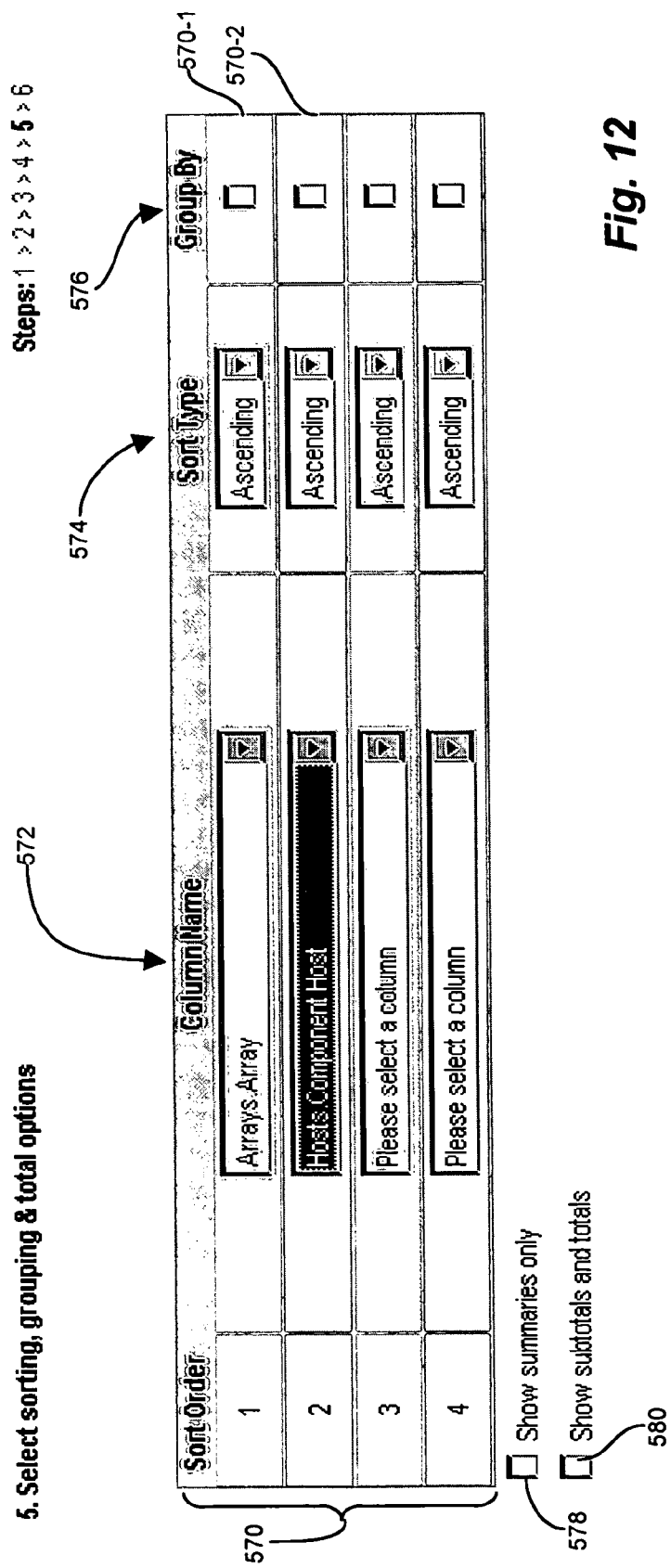

FIG. 12 shows sorting and grouping options. Referring to FIG. 12, one or more sort entries 570 define a hierarchical order for sorting or grouping output report 186 entries. Each of the entries 570 has a column name 572 for specifying the attribute to be sorted or grouped on. For each selected attribute, a sort type specifier 574 indicates a sorting order, and a group selection 576 indicates whether to subtotal similar attribute values together Sorting is carried out first on the first element 570-1, then within similar values for the first 570-1 column 572, according to the second sort element 570-2, and so on, thus yielding a hierarchical sorted arrangement (i.e. Field A within Field B within Field C, etc.). A summaries checkoff 578 shows only the sum counts for the fields, rather than reporting each individual line item. A subtotals/totals checkoff 580 shows each nested subcount within the previous entry 570-N designation, e.g. for fields A, B, and C, field C sums are shown within each increment of field B, and sums for field B are shown within each increment of Field A.

FIG. 13 shows selection of run settings which limit excessive or unintended execution of the query 180. A record limit 582 limits the total number of records returned, such that a query inadvertently gathering an unwieldy number of records is not processed. A query resulting in thousands of printed pages of output may not be useful in particular circumstances. An execution limit 584 specifies a time limit, so that computationally intensive queries do not exhaust CPU resources. A particularly complex join or inclusion of multiple large tables may result in a report generation attempt which requires substantial CPU resources. The execution limit 584 provides a ceiling to avoid such "runaway" queries. Output specifiers 586 and 588 allow output format and type specifications, respectively. An email checkoff 590 also provides a confirmatory email. The GUI also provides an option to e-mail the resulting report as an attached file (e.g. PDF).

Figure 15:
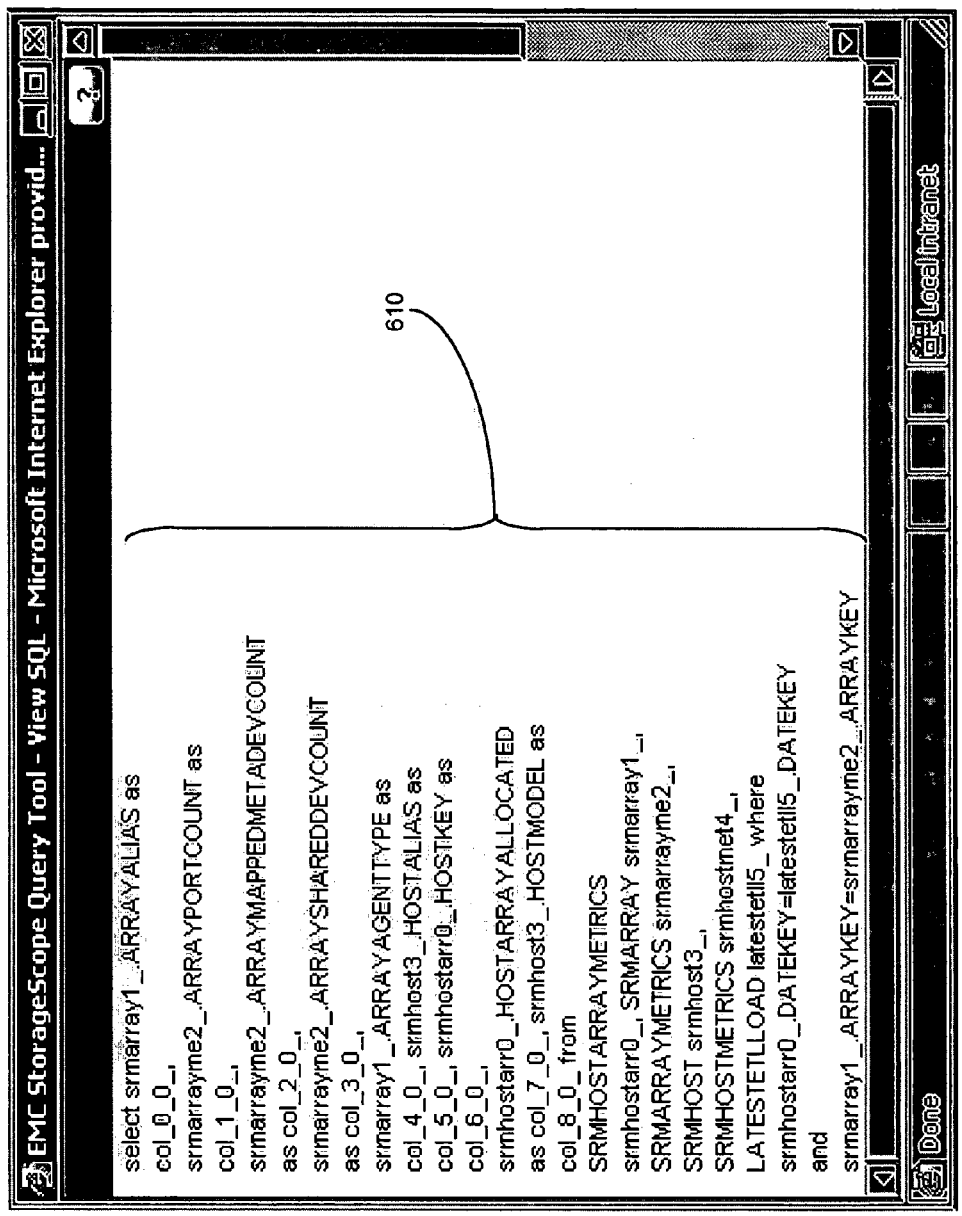

FIG. 14 shows an exemplary output report 186. Referring to FIGS. 9 and 14, the exemplary output includes one or more entries 600, each having a output field 602 for each of the selected columns 532. Entries 600 are included for each report record, typically each joined "tuple" after filters are applied. A view SQL button 604 allows display of the query 180 generated by the query logic 156 and performed by the query processor 154. Referring to FIG. 15, the SQL query 610 is generated SQL syntax based on the criteria entered in the GUI screens in FIGS. 7-13. The resulting SQL query 180 may be saved and modified, as shown in FIG. 15. FIG. 15 shows a SQL listing 610 of an exemplary generated query 180. The generated queries 180 may be stored, cataloged, modified, and reused for successive queries. In the exemplary configuration, the files that define the query are XML-based, and the query processor 154 dynamically generates the corresponding SQL syntax at run-time, as shown by the query file list 620 in FIG. 16. In this manner, an operator may repeat a particular query on a regular basis, and may modify a predetermined query for a particular purpose.

Those skilled in the art should readily appreciate that the programs and methods for modeling a report database in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media. The operations and methods may be implemented in a software executable object or as a set of instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for generating a query via a GUI has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of processing report queries in a storage area network (SAN) comprising:
   identifying managed objects for inclusion in a report, the managed objects responsive to a management application for performing actions in the SAN;
   determining tables in an online database containing attributes of the managed objects, the attributes reflective of the performed actions;
   computing relations between the determined tables, the relations associating tables of a particular type to other tables of another type based on attribute values, computing relations further comprising:
      traversing an object model corresponding to the tables in the online database;
      identifying relations between the tables; and
      identifying key fields including at least one attribute of a table;
   computing fields applicable to the report by traversing the computed relations;
   transforming the online database to an offline query database, the offline query database having a star schema of tables corresponding to facts and dimensions, the dimensions further including at least one of time, location, region, product and department;
   displaying a Graphical User Interface (GUI) for selecting managed objects according to mnemonic labels;
   receiving selections of managed objects from the GUI;
   mapping the selections to corresponding tables;
   generating a query operable to compute the report from the determined tables, the query having a scripted format adapted for interactive modification and customization;
   generating a mapping of the identified managed objects to mnemonic query labels, the mnemonic query labels for displaying, to a user via a GUI, selections of the managed objects in an intuitive manner, the intuitive manner indicative of the managed object;
   displaying the mnemonic query labels to a query user; and
   receiving a selection of the mnemonic query labels, the mnemonic query labels for mapping to tables in the offline query database.

2. The method of claim 1 wherein computing fields further comprises defining a join between applicable tables according to the identified relations.

3. The method of claim 1 further comprising executing the query on the report database to generate a query result, the execution performing joins including a fact table and at least one dimension table.

4. The method of claim 1 further comprising:
   selecting a predetermined query from a list of predetermined queries, the predetermined queries operable to generate a report responsive to user request criteria corresponding to the predetermined query; and
   modifying the selected predetermined query via an interactive interface by modifying statements in the query.

5. The method of claim 1 wherein the attributes correspond to database labels and the mapping correlates database labels to managed object labels displayable on the GUI.

6. The method of claim 5 wherein generating the query further includes determining attributes to be included as result fields.

7. The method of claim 6 further comprising defining a filter for at least one result field.

8. The method of claim 7 further comprising defining groupings for at least one result field, the groupings defining a nested sorting arrangement for the grouped result fields.

9. The method of claim 8 further comprising defining limit settings for the output report generation, the limit settings operable to direct the output result by specifying undesirable results.

10. The method of claim 7 further comprising defining an additional report field, the additional result field generated from selected attributes in the query and at least one operation, the additional report field generating a deterministic value based in the selected attributes and operations.

11. A data processing device for processing report queries in a storage area network comprising:
    a decision support processor having a graphical user interface operable to identify managed objects for inclusion in a report, the managed objects responsive to a management application for performing actions in the SAN;
    query logic configured to determine tables in an online database containing attributes of the managed objects, the attributes reflective of the performed actions; and
    metadata employed for computing relations between the determined tables,
    relations logic configured to perform the following steps:
       traversing an object model corresponding to the tables in the online database;
       identifying relations between the tables; and
       identifying key fields including at least one attribute of a table,
    the relations associating tables of a particular type to other tables of another type based on attribute values, the query logic further operable to compute fields applicable to the report by traversing the computed relations; and
    transforming the online database to an offline query database, the offline query database having a star schema of tables corresponding to facts and dimensions, the dimensions further including at least one of time, location, region, product and department,
    the metadata pertaining to a database other than the one from which the queried data is sought, the decision support processor further:
    displaying a GUI for selecting managed objects according to mnemonic labels, the managed objects responsive to a management application for performing actions in the SAN;
    receiving selections of managed objects from the GUI, the managed objects including storage arrays, connectivity devices, and hosts;
    mapping the selections to corresponding tables; and
    generating a query operable to compute the report from the determined tables, the query having a scripted format adapted for interactive modification and customization.

12. The device of claim 11 wherein computing fields further comprises defining a join between applicable tables according to the identified relations.

13. The device of claim 12 wherein the query logic is further adapted to generate a query operable to compute the report from the determined tables, the query having a scripted format adapted for interactive modification and customization, further comprising a query processor operable to execute the generated query on the report database to generate a query result, the execution performing joins including a fact table and at least one dimension table.

14. A computer program product having a computer readable storage medium operable to store computer program logic embodied in computer instructions encoded thereon that, when executed by a processor, perform a method for processing report queries in a storage area network, the method comprising:
  identifying managed objects for inclusion in a report, the managed objects responsive to a management application for performing actions in the SAN;
  determining tables in an online database containing attributes of the managed objects, the attributes reflective of the performed actions;
  computing relations between the determined tables, the relations associating tables of a particular type to other tables of another type based on attribute values, computing relations further comprising:
  traversing an object model corresponding to the tables in the online database; identifying relations between the tables; and
  identifying key fields including at least one attribute of a table;
  computing fields applicable to the report by traversing the computed relations;
  displaying a Graphical User Interface (GUI) for selecting managed objects;
  receiving selections of managed objects from the GUI;
  mapping the selections to corresponding tables, the attributes corresponding to database labels and the mapping correlates database labels to managed object labels displayable on the GUI; and
  transforming the online database to an offline query database, the offline query database having a star schema of tables corresponding to facts and dimensions, the dimensions further including at least one of time, location, region, product and department;
  displaying a GUI for selecting managed objects according to mnemonic labels, the managed objects responsive to a management application for performing actions in the SAN;
  receiving selections of managed objects from the GUI, the managed objects including storage arrays, connectivity devices, and hosts;
  mapping the selections to corresponding tables; and
  generating a query operable to compute the report from the determined tables, the query having a scripted format adapted for interactive modification and customization.

15. A data processing device for processing report queries in a storage area network comprising:
  means for identifying managed objects for inclusion in a report, the managed objects responsive to a management application for performing actions in the SAN;
  means for determining tables in an online database containing attributes of the managed objects, the attributes reflective of the performed actions;
  means for computing relations between the determined tables, the relations associating tables of a particular type to other tables of another type based on attribute values, computing relations further comprising:
    traversing an object model corresponding to the tables in the database;
    identifying relations between the tables; and
    identifying key fields including at least one attribute of a table;
  means for computing fields applicable to the report by traversing the computed relations;
  means for displaying a GUI for selecting the managed objects, the managed objects responsive to a management application for performing actions in the SAN;
  means for receiving selections of managed objects from the GUI, the managed objects including storage arrays, connectivity devices, and hosts;
  means for mapping the selections to corresponding tables, the attributes corresponding to database labels and the mapping correlating database labels to managed object labels displayable on the GUI;
  means for generating a query operable to compute the report from the determined tables, the query having a scripted format adapted for interactive modification and customization, generating the query further includes determining attributes to be included as result fields; and
  means for transforming the online database to an offline query database, the offline query database having a star schema of tables corresponding to facts and dimensions, the dimensions further including at least one of time, location, region, product and department;
  means for displaying a gui for selecting managed objects according to mnemonic labels;
  means for receiving selections of managed objects from the GUI;
  means for mapping the selections to corresponding tables; and
  means for generating a query operable to compute the report from the determined tables, the query having a scripted format adapted for interactive modification and customization.

16. The method of claim 1 wherein the mnemonic labels intuitively indicate the real-world entities to which they correspond, the corresponding real-world entities being readily understood by a GUI operator.

17. The computer program product of claim 14 further comprising:
  generating a mapping of the identified managed objects to mnemonic query labels, the mnemonic query labels for displaying, to a user via a GUI, selections of the managed objects in an intuitive manner, the intuitive manner indicative of the managed object;
  displaying the mnemonic query labels to a query user; and
  receiving a selection of the mnemonic query labels, the mnemonic query labels for mapping to tables in the offline query database.

18. The computer program product of claim 17 wherein the mnemonic labels intuitively indicate the real-world entities to which they correspond, the corresponding real-world entities being readily understood by a GUI operator.

* * * * *